United States Patent Office 3,456,022
Patented July 15, 1969

3,456,022
3,4,7,8-TETRABROMO-[4.3.0]BICYCLONONANE
Harold A. Wright, Murrysville, Pa., assignor to Koppers Company, Inc., a corporation of Delaware
No Drawing. Filed June 16, 1966, Ser. No. 557,915
Int. Cl. C07c 23/20; C08f 47/08; C09k 3/28
U.S. Cl. 260—648                                    1 Claim

ABSTRACT OF THE DISCLOSURE

A new composition of matter, 3,4,7,8-tetrabromo-4.3.0-bicyclononane is described. The 3,4,7,8-tetrabromo-4.3.0-bicyclononane is a useful self-extinguishing agent for polymers and because of its relatively high melting point (153–154° C.) remains solid during processing of plastic compositions at normal processing temperatures and, thus, does not act to plasticize and cause the molding properties of the polymer to deteriorate.

---

This invention relates generally to a new self-extinguishing agent 3,4,7,8 - tetrabromo-4.3.0-bicyclononane and self-extinguishing polymer compositions containing 3,4,7,8-tetrabromo-4.3.0-bicyclononane.

Polymer foams are so light in weight and have such good heat insulating qualities that their use in building construction is highly desirable. A prerequisite for such use is that the foam have fire-retardant properties. In the past, certain brominated organic compounds have been utilized for this purpose. While these compounds have been found to be effective to render the polymer compositions self-extinguishing, when used in amounts sufficient to achieve the desired degree of fire retardancy, the molding properties of the polymers are adversely affected. For example, in molding expandable styrene polymer beads containing self-extinguishing agents, it is found that the presence of the self-extinguishing agents causes poor fusion of the particles and shrinkage of the polymer foam. This is because the brominated compounds which have been found to be effective are either liquids or low-melting solids (i.e., melting points below 120° C.) and therefore, the compounds act to plasticize the polymer to such an extent that the molding properties deteriorate. As a result, the polymer's usefulness becomes marginal or submarginal for many applications where self-extinguishing properties are required such as the molding of insulation board for use in building panels.

I have discovered a novel compound 3,4,7,8-tetrabromo-4.3.0-bicyclononane:

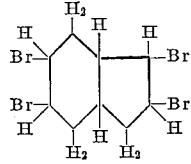

which has a relatively high melting point (153–154° C.). The compound remains in the solid state during the processing of the plastic at normal processing temperatures and therefore, does not act to plasticize the polymer and cause the molding properties to deteriorate. In spite of the relatively high melting point, the compound still acts to cause the polymer to be self-extinguishing. The compound has good hydrolytic stability and is white and thus imparts no color to the plastic. The novel compound is conveniently prepared by the bromination of 4.3.0-bicyclononadiene-3,7.

According to this invention, self-extinguishing organic polymer compositions are provided by mixing with said polymer compositions 3,4,7,8 - tetrabromo-4.3.0-bicyclononane. The self-extinguishing agent can be incorporated into the polymers either by adding it to a monomer and then polymerizing the monomer as well as by adding to the polymer. For example, it can be incorporated in the heat plastified polymer by mixing in conventional mixing and extrusion equipment prior to molding the polymer or while processing the polymer into pellets, which are a convenient form for molding. Alternatively, it can be added to the monomer mixture prior to the polymerization of the monomers by conventional methods such as suspension polymerization.

The 3,4,7,8 - tetrabromo - 4.3.0 - bicyclononane can be used to render a variety of organic polymers self-extinguishing; for example, polymers and copolymers derived from such monomers as ethylene, propylene, styrene, isopropylstyrene, alpha-methylstyrene, nuclear methylstyrenes, chlorostyrenes, vinyl naphthalene, acrylonitrile, divinylbenzene, methyl methacrylate, butadiene, etc. While these polymers can include both foamed and non-foamed material, the novel self-extinguishing agent has been found to be particularly advantageous for use with polymer foams derived from vinyl aryl polymers such as polystyrene. A convenient form of polystyrene for molding into foamed articles is polystyrene beads prepared in aqueous suspension by a process such as is described for example in U.S. Patent No. 2,907,756, wherein a vinyl aryl monomer is polymerized in aqueous suspension in the presence of a catalyst system of t-butylperbenzoate and benzoyl peroxide at a fixed time temperature cycle using suspending agents to maintain the monomer suspended in the aqueous medium in the form of particles or beads.

The polymer particles are rendered expandable by incorporating a blowing agent into the particles either during or after the polymerization. Processes for such incorporation are described in Patent No. 3,192,169 and Patent No. 2,983,692. Preferred blowing agents include volatile aliphatic hydrocarbons containing from one to seven carbon atoms in the molecule, i.e., ethane, methane, propane, butane, pentane, isopentane, hexane, heptane, cyclohexane, and their halogenated derivatives which boil below the softening point of the polymer. Usually from 3–20% by weight of polymer of the blowing agent is incorporated therein.

The self-extinguishing agent is incorporated into the polymers in an amount of from about 1–15% by weight. Below 1% by weight the desired self-extinguishing properties are not achieved and no advantage is obtained from using more than 15% by weight of the self-extinguishing agent. The preferred range of self-extinguishing agent would be from 1–5% by weight of polymer. If desired, organic peroxide synergists such as dicumyl peroxide, 2,5-dimethyl-2,5-di(t-butylperoxy)hexyne-3, di-t-butyl peroxide, cumyl tertiary-butyl peroxide, etc. can be added in amounts of about 0.1 to 2.0 percent by weight of polymer. The peroxide synergist permits smaller amounts of the self-extinguishing agent to be employed while still producing a self-extinguishing polymer.

The invention is further illustrated but not limited by the following examples wherein parts are parts by weight unless otherwise indicated.

Example I

To prepare the 3,4,7,8-tetrabromo-4.3.0-bicyclononane which is the novel self-extinguishing agent, 54 grams of 4.3.0-bicyclononadiene-3,7 was dissolved in 146 ml. of nitrobenzene in a closed, 1-liter flask equipped with an agitator and thermometer. The solution was chilled to a temperature of 0–2° C. in an ice water bath. When the temperature reached 0–2° C. to a dropping funnel mounted on the flask was added 54 ml. of nitrobenzene and then 158 grams of bromine was dissolved in the nitrobenzene. The solution of bromine was slowly added to the flask containing the 4.3.0-bicyclononadiene-3,7 in nitrobenzene with agitation and cooling to maintain the reaction temperature below 15° C. The reaction was highly exothermic. After all of the solution of bromine had been added, which took 50 minutes, the agitation of the mass was continued for an additional 90 minutes with the temperature being gradually decreased to 0–2° C. The cold reaction mixture was then filtered on a fritted glass funnel which took 20 minutes. The filter cake was reslurried in the funnel with 100 ml. of hexane and the hexane removed by filtration. The hexane wash was repeated three more times each with 100 ml. of hexane, after which time the yield of about 70 grams of solids was air dried to a fine cream colored powder. The powder was recrystallized from acetone and washed with methanol. The white crystalline product had a melting point of 153–154° C. The yield of purified 3,4,7,8-tetrabromo-4.3.0-bicyclononane was about 59 grams or about 30%. On analysis the bromine content was found to be 72.7% (theoretical 72.7%).

Example II

To incorporate the self-extinguishing agent by adding it to the monomer and then polymerizing the monomer, there was added to a crown-capped 12-ounce bottle 80.0 parts of styrene monomer having dissolved therein 1.6 parts of the self-extinguishing agent, 3,4,7,8-tetrabromo-4.3.0-bicyclononane, 0.20 part of the catalyst consisting of 0.16 part of benzoyl peroxide and 0.04 part of t-butyl perbenzoate, and as the self-extinguishing synergist, 0.28 part of 2,5-dimethyl-2,5-di(t-butylperoxy)hexyne-3. To the bottle was then added the suspending medium which was 120 parts of water containing as suspension aids .15 part of hydroxyethylcellulose and .06 part of tetrasodium pyrophosphate. The bottles were placed in an oil bath and the styrene monomer polymerized with end-over-end agitation for 8 hours at 90° C. after which the temperature was increased to 115° C. during one-half hour and maintained at 115° C. for four hours. The bottle was then cooled to 30° C., opened, and the product polymer beads were rendered expandable by adding to the bottle as dispersion aids, 2.4 parts of sodium chloride and 2 parts of a 5% by weight aqueous solution of polyoxyethylene (20) sorbitan monolaurate, and 6.5 parts of the blowing agent, n-pentane. The bottle was capped and rotated in an oil bath for ten hours at 100° C. to incorporate the pentane mixture into the beads. The beads were separated from the suspension medium by filtration and air dried, after being thoroughly washed with water.

The dry beads were then expanded in atmospheric steam for 2–4 minutes to a density of approximately 1.36 lbs./cu. ft. The beads were permitted to age for 24 hours in the atmosphere and the pre-expanded beads were then molded into a ½″ x 5″ x 5″ block between the platens of an electrically heated press. The foam block had a density of 1.36 lbs./cu. ft. and the fusion was excellent.

The foam block was cut into five one-inch strips and the strips conditioned overnight in a 50–60° C. oven to remove any residual blowing agent. Self-extinguishing tests were conducted on the foam strips, suspended vertically in a draft-free hood and ignited by holding a ½-inch flame from a micro burner in contact with the bottom of each strip for from 3–5 seconds. The average time to extinguishment of sustained burning after the flame was removed from the strips for the five strips was 0.2 second. An average time to extinguishment of 1.0 second or less is considered to be adequate for commercial acceptability.

Example III

To illustrate the effect of variation in the quantity of self-extinguishing agent, there was added to a number of 12-ounce crown-capped bottles in the following order:

120 parts of water containing therein, as suspending agents, 0.64 part of tricalcium phosphate and .0048 part of dodecylbenzene sodium sulfonate (Nacconol NRSF) along with 80 parts of the monomer styrene containing 0.36 part of the catalyst consisting of 0.24 part of benzoyl peroxide and 0.12 part of t-butyl perbenzoate along with 0.28 part of the self-extinguishing synergist 2,5-dimethyl-2,5-di(t-butylperoxy)hexyne-3 and X parts of the self-extinguishing agent 3,4,7,8 - tetrabromo - 4.3.0-bicyclononane, where X is the percent by weight based on styrene shown in Table I below. The bottles were capped and rotated end-over-end in an oil bath for 7 hours at 92° C. The bottles were then cooled to 25° C. and there was added to each bottle 0.8 part of tricalcium phosphate and 0.008 part of Nacconol NRSF as additional dispersing agents along with 1.2 parts of sodium chloride and 7.0 parts of the blowing agent, n-pentane. The bottles were recapped and heated with end-over-end agitation for one hour at 92° C. The temperature was then raised to 115° C. which took 20 minutes and maintained at 115° C. for an additional 4 hours to impregnate the beads with blowing agent and complete the polymerization. Each group of product polymer beads were separated from the aqueous medium by filtration and thoroughly washed with water and air dried on trays.

Aliquots of the beads were pre-expanded in atmospheric steam for 2–4 minutes to the densities shown in Table I. Portions of each group of pre-expanded beads were then molded into ½″ x 5″ x 5″ blocks. The fusion in each case was excellent. The foam block was cut into five one-inch strips and the strips conditioned as described in Example II and the self-extinguishing time of each strip was determined as described in Example II with the time to extinguishment shown in Table I below. It can be seen that the self-extinguishing characteristics of those foams having 2% or more of the novel self-extinguishing agent had exceptional average times to extinguishment (0.2 second). Even in the case of the foam containing 3% by weight self-extinguishing agent, the shrinkage of the foams was nil. In contrast, shrinkage of foam prepared by the same procedure except containing 3% by weight of the well-known fire-retardant, Firemaster T–23P (tris-(2,3-dibromopropyl)phosphate) instead of the tetrabromobicyclononane was so great that is was commercially unusable. Furthermore, whereas as shown in Table I, the novel tetrabromobicyclononane is effective at concentration levels of one percent, foams containing Firemaster T–23P require a level of at least two percent in order to be effective.

Example IV

A mixture of 98 parts of crystal polystyrene (Dylene® 8, Sinclair-Koppers Company) and 2 parts of 3,4,7,8-tetrabromo-4.3.0-bicyclononane were added to the hopper of a conventional heated extruder wherein the polystyrene was heated to a plastifying temperature and the tetrabromobicyclononane thoroughly dispersed within the heat-plastified polystyrene. The material was extruded in the form of thin strands which were passed through a cooling bath and then to a pelletizer where they were cut into small pellets.

Portions of the pellets were injection molded into bars having the dimensions of 8″ x ½″ x ⅛″. Each bar was suspended at a 45° angle in a draft-free hood and the tip of a ½″ flame from a micro burner held in contact with the lower edge of the bar for 5–10 seconds to ignite the plastic and then the flame was removed and the time to extinguishment of the flame was measured. The average time to extinguishment was 15 seconds. An extinguishment time of 20 seconds is adequate for commercial acceptability.

TABLE I

| Self-extinguishing agent | | Percent by weight of polymer of self-extinguishing agent | Lbs./cu. ft. | | Shrinkage of Molded foam | Average Extinguishment time |
|---|---|---|---|---|---|---|
| | | | Pre-expanded beads | Molded block | | |
| III-1 | 3,4,7,8-tetrabromo-4.3.0-bicyclononane | .5 | 1.9 | 1.9 | Nil | (¹) |
| III-2 | do | 1.0 | 1.7 | 1.7 | Nil | 1.0 |
| III-3 | do | 1.5 | 1.8 | 1.8 | Nil | 0.8 |
| III-4 | do | 2.0 | 1.3 | 1.3 | Nil | 0.2 |
| III-5 | do | 2.5 | 1.7 | 1.7 | Nil | 0.2 |
| III-6 | do | 3.0 | 1.5 | 1.5 | Nil | 0.2 |
| III-7 | Firemaster T-23P tris-(2,3-dibromopropyl) phosphate | 3.0 | 1.9 | 3.0 | Gross | 0.5 |
| III-8 | do | 2.0 | 1.8 | 2.5 | Slight | 0.7 |
| III-9 | do | 1.5 | 1.7 | 2.0 | do | (¹) |

¹ Burned.

The foregoing has described a novel compound 3,4,7,8-tetrabromo-4.3.0-bicyclononane which has been found to be an effective self-extinguishing agent for organic polymers yet does not act to plasticize the polymers and thereby cause their molding properties to deteriorate.

I claim:
1. 3,4,7,8-tetrabromo-4.3.0-bicyclononane.

References Cited

Crigee et al.: "Chem. Ber.," vol. 84, p. 218 (1951).

BERNARD HELFIN, Primary Examiner

M. M. JACOB, Assistant Examiner

U.S. Cl. X.R.

252—8.1; 260—45.7